United States Patent [19]
Carpenter et al.

[11] Patent Number: 5,723,213
[45] Date of Patent: Mar. 3, 1998

[54] INTEGRATED MULTIPLE-CERAMIC-LAYER FIBER INTERFACIAL COATING

[75] Inventors: Harry Wellington Carpenter, Fallbrook; Robert Vernon Carter, Hawthorne; Mary Wagner Colby, Whittier; David Eric Daws, Westminister, all of Calif.

[73] Assignee: Northrop Grumman Corporation, Los Angeles, Calif.

[21] Appl. No.: 544,799

[22] Filed: Oct. 18, 1995

[51] Int. Cl.$^6$ ............................................. B32B 9/00
[52] U.S. Cl. ................... 428/336; 428/368; 428/408; 428/698
[58] Field of Search ....................... 428/368, 698, 428/408, 216, 336

[56] References Cited

U.S. PATENT DOCUMENTS

| | | |
|---|---|---|
| 3,869,335 | 3/1975 | Siefert . |
| 4,642,271 | 2/1987 | Rice ........................... 428/698 |
| 4,863,798 | 9/1989 | Arenz et al. . |
| 4,867,761 | 9/1989 | Brandt et al. ................. 501/87 |
| 4,885,199 | 12/1989 | Corbin et al. ................ 428/336 |
| 4,916,092 | 4/1990 | Tiegs et al. ................... 428/368 |
| 4,921,822 | 5/1990 | Luthra . |
| 4,933,309 | 6/1990 | Luthra . |
| 5,026,604 | 6/1991 | Thebault ....................... 428/367 |
| 5,057,465 | 10/1991 | Sakamoto et al. . |
| 5,110,771 | 5/1992 | Carpenter et al. . |
| 5,162,271 | 11/1992 | Carpenter et al. . |
| 5,221,578 | 6/1993 | Carpenter et al. . |
| 5,275,984 | 1/1994 | Carpenter et al. . |

*Primary Examiner*—Archene Turner
*Attorney, Agent, or Firm*—Terry J. Anderson; Karl J. Hoch, Jr.

[57] ABSTRACT

The present invention is embodied in a ceramic matrix composite, comprising a ceramic fiber, a multi-layer coating on the fiber comprising plural alternating layers of an easily-cleaved material and an oxidation resistant material, and a ceramic matrix contacting the coating, the fiber and coating being embedded in the matrix.

21 Claims, 2 Drawing Sheets

INTEGRATED MULTIPLE-CERAMIC-LAYER FIBER INTERFACIAL COATING

BACKGROUND OF THE INVENTION

1. Technical Field

This invention relates to a ceramic matrix composite ("CMC") in which fibers have been coated with an oxidation resistant, multiple-ceramic-layer coating that facilitates fiber-matrix debonding in advance of a crack in the matrix to improve toughness of the CMC.

2. Background Art

Continuous fiber reinforced CMCs are formed of continuous uniaxial or woven fibers of ceramic material embedded in a ceramic matrix. These materials are designed to have a weak fiber-matrix bond strength to increase strength and toughness. When the CMC is loaded above a stress that initiates cracks in the matrix, the fibers debond from the matrix allowing fiber/matrix sliding without fiber fracture. This allows fibers to bridge the matrix crack and transfers the load to the surrounding matrix by transferring the tensile stresses to frictional interfacial shear forces, and increases the load required for further crack propagation.

The strength and toughness of such materials can be increased by applying various coatings to the fibers in the CMC. For example, in U.S. Pat. No. 5,110,771 to Carpenter et al., a precracked coating is formed in situ on ceramic fibers in a CMC to promote fiber debonding and pull-out. Since these objects are achieved by mechanical means in this approach, the coating materials can be selected to resist oxidation and for stability at high temperatures. This approach has many advantages, but it has proven difficult to identify and consistently reproduce the optimum precrack size and distribution to achieve the desired mechanical properties.

Another approach is to coat the fibers in a CMC with a ductile metal to blunt advancing cracks and absorb strain energy as taught in U.S. Pat. No. 5,162,271 to Carpenter et al. Again, since a mechanical feature of the coating (i.e. ductility) achieves the object of toughening the CMC, the metal can be chosen for oxidation resistance and stability at high temperatures. However, oxidation resistant metals such as those disclosed in this approach (i.e. noble metals) are expensive. In addition, this approach does not result in the advantageous fiber debonding and pull-out mechanism that enhances toughness and strength.

A porous coating on fibers in a CMC has also been proposed to promote fiber debonding and pull-out at advancing cracks to toughen the CMC in U.S. Pat. No. 5,221,578 to Carpenter et al. The pores are kept empty by means of a non-porous sealing layer to render the coating frangible to enable fiber pull-out. Reliance on the mechanical properties of the coating again allows the material for the coating to be selected to achieve other objects such as oxidation resistance and stability at high temperatures. However, it has proven difficult with this approach to identify and consistently reproduce the optimum pore size and distribution to achieve the desired mechanical properties.

Yet another mechanical approach is taught in U.S. Pat. No. 5,275,984 to Carpenter et al. in which multiple layers that are either unbonded or weakly bonded to one another are coated on the fibers in a CMC to enhance fiber debonding. The reduced bonding strengths between the multiple layers is achieved by alternating layers of different ceramic materials, layers of the same material with different morphologies, or chemically poisoning successive layers with impurities. This approach is limited, however, by rough interlocking interfaces, and the potential interdiffusion of multiple layers after long duration exposures at elevated temperatures. This can result in a monolithic structure with increased fiber-matrix bonding and reduced tendency for fiber pull-out.

In the present invention, the desired mechanical features that promote fiber pull-out and debonding are achieved by alternating layers of materials that promote fiber sliding and materials that are resistant to oxidation and stable at higher temperatures. The materials that promote fiber pull out fail at low shear stresses to achieve fiber debond and the dense, oxidation resistant material protects the fiber sliding materials from oxidation and provides a stable substrate for the low shear strength material layer. Although the invention relies on the inherent features of the composition of these materials for these properties, a range of materials has been shown to be compatible and capable of cooperating to achieve these mechanical features.

As one example, very thin layers of a material that promotes fiber/matrix sliding such as BN are alternately deposited with an oxidation resistant material such as SiC on a fiber in a CMC. The layers are each preferably in the range of 100 to 1,000 angstroms in thickness. SiC was selected as a preferred oxidation resistant material because when it is applied by chemical vapor deposition, it forms a very dense layer that is an effective barrier to gas diffusion, such as oxygen. Another material that could perform this function in the invention is $Si_3N_4$. BN is a preferred material to promote fiber sliding because it is easily cleaved on atomic planes, resulting in sliding at low shear stresses. Another compatible material with this property is C.

A CMC made in accordance with the invention overcomes the problems and limitations of the prior art, such as those described above, and provide a very robust material. For example, the multiple layers can tolerate large variances in thickness and continue to achieve the objects of the invention. Both materials can vary in thickness from 100 angstroms to 5,000 angstroms and still provide the necessary oxidation protection and fiber debonding. This degree of manufacturing tolerance can substantially reduce manufacturing costs and increase yields.

Manufacturability is also improved with fibers of the invention because of their very small diameters and thin coatings. The small thickness reduces the likelihood of the layers cracking during fabrication of the CMC weave over curved molds to form shaped CMC structures. The very thin structure also improves durability of the CMC component because the layers are less likely to crack in service, i.e. under stress, than other approaches to CMC fiber strengthening.

In addition, the redundancy inherent in multiple layers with independent failure mechanisms increases the robustness of the invention. If one set of layers does not slide across one another to result in fiber debonding in advance of a crack, others layers will slide and achieve the desired fiber debonding.

In addition, fibers of the invention are compatible with, and achieve the objects of the invention with, a range of ceramic matrices, including oxides, non-oxides, carbides, and nitrides.

SUMMARY OF THE INVENTION

The present invention is embodied in a ceramic matrix composite, comprising a ceramic fiber, a multi-layer coating on the fiber comprising plural alternating layers of an easily-cleaved material and an oxidation resistant material, and a ceramic matrix contacting the coating, the fiber and coating being embedded in the matrix.

DETAILED DESCRIPTION OF THE PREFERRED EMBODIMENT

Figure 1:
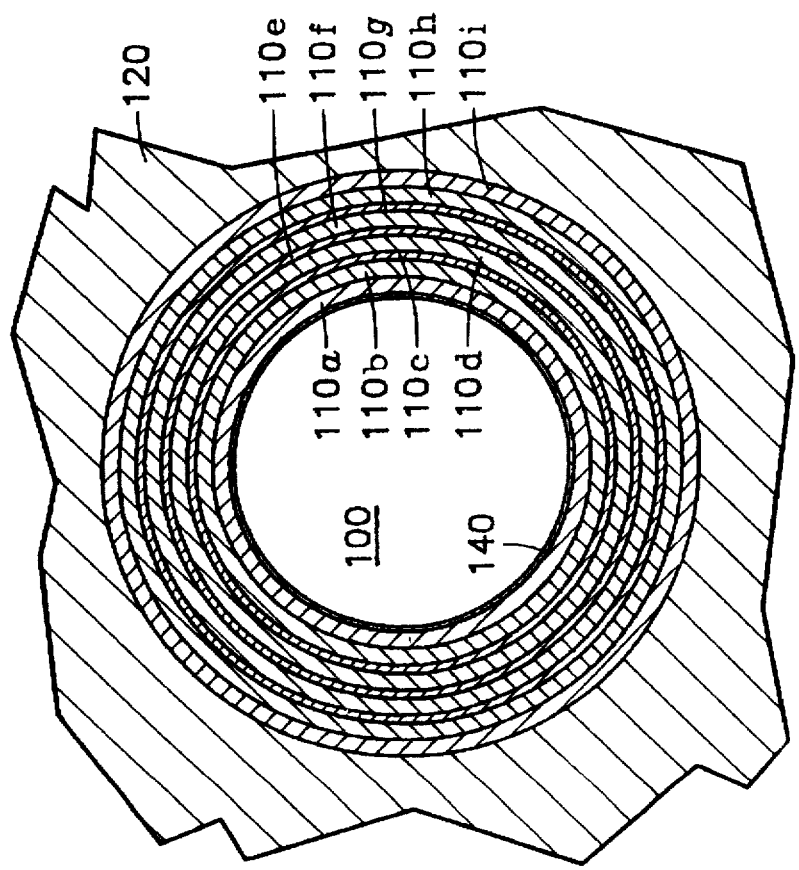
FIG. 1 is a cross section of a fiber coated with multiple layers of materials in accordance with the invention.

As shown in FIG. 1, a ceramic fiber 100 is coated with a multiple-ceramic-layer interfacial coating 110. The fiber 100 may be an oxide or non-oxide ceramic and typically is on the order of 10 microns in diameter. The fiber 100 and coating 110 are immersed in a ceramic matrix 120 to form a CMC using techniques known in the art.

The coating 110 is made of layers 110A, 110B, 110C, 110D, 110E, 110F, 110G, 110H, and 110I composed alternately of an oxidation resistant material and an easily cleaved material. For example, layer 110A could be made of SiC (an oxidation resistant material), layer 110B made of BN (an easily cleaved material), layer 110C made of SiC, and layer 110D made of BN. Nine layers 110A–110I are shown in the embodiment of FIG. 1, with a total thickness of approximately 0.66 microns. Although nine layers 110 are illustrated in FIG. 1, other numbers of layers could be used and achieve the objects of the invention. For example, as few as three layers (two corrosion resistant layers and one easily cleaved layer) have been successfully tested. A greater number of layers increases the redundancy in failure mechanisms and robustness of a CMC according to the invention, but may also increase the cost of such a CMC. Nine layers 110 is a preferred number of layers to balance these considerations.

The first and last oxidation resistant layers, 110A and 110I, respectively, have a preferred thickness on the order of 1,000 angstroms in order to provide additional strength to hold the MCL together by compression forces and to avoid damage in handling during weave forming. The easily cleaved layers 110B, 110D, etc. also have a preferred thickness on the order of 1,000 angstroms to provide the shear strain necessary for fiber debonding. The intermediate oxidation resistant layers 110C, 110E, etc. have a preferred thickness on the order of 200 angstroms, which is adequate to provide the oxidation protection for the easily cleaved layers 110B, 110D, etc. The layer 110I adjacent to the matrix 120 is formed of an oxidation resistant material to protect the outermost easily cleaved layer 110H and because the easily cleaved materials react with the matrix 120. For example, BN interdiffuses in certain ceramic materials.

Materials of compositions other than those described previously may be used and achieve the same objects. For example, an alternate easily cleaved material is C, and an alternate oxidation resistant material is $Si_3N_4$. Alternating layers of BN or C and SiC or $Si_3N_4$ have been found to improve strength and toughness in a ceramic fiber/CMC composed of a silicon oxycarbide ceramic matrix (such as Blackglas made by AlliedSignal Inc. of Des Plaines, Ill.) and oxycarbide ceramic fibers (such as Nicalon made by Nippon Carbon Company of Japan).

The layers 110A–110I are deposited using conventional methods, such as chemical vapor deposition, physical vapor deposition or from solution. In a preferred method, alternating layers are formed by separate chemical vapor deposition steps because chemical vapor deposition better controls the thickness and uniformity of the layers 110.

In another aspect of this embodiment, a very thin protective layer 140 of a material resistant to corrosive gases, such as BN or C, is deposited directly on the fiber 100 prior to deposition of the layer 110 to protect the fiber 100 from corrosive gases formed during chemical vapor deposition, such as HCl gas. Layer 140 typically has a thickness in the range of 50–100 angstroms, which is adequate to achieve this purpose.

Figure 2:
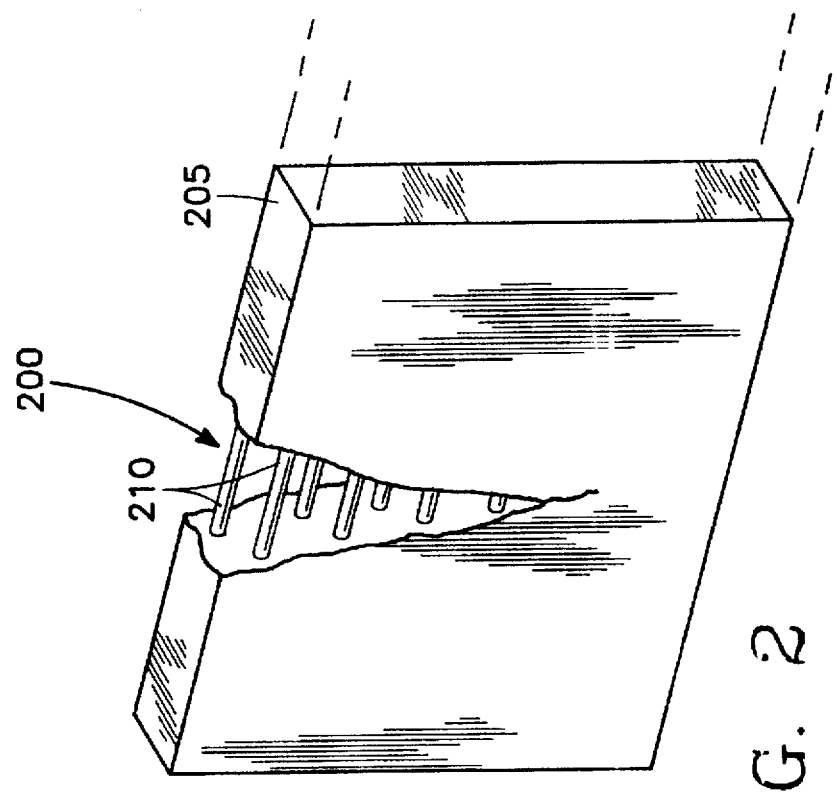
FIG. 2 is a perspective view of a ceramic matrix composite after a crack has formed in the matrix and the fibers of FIG. 1 have debonded, forming bridges across the crack.

When a load is applied to a material of the invention as shown in FIG. 2, the tensile stress G is increased until a crack 200 initiates in the matrix 205. When the tip of the crack 200 encounters a fiber 210, the fiber 210 debonds from the matrix 205 without fracture of the fiber 210, allowing the fiber 210 to bridge the crack 200. After this bridging occurs, the stress σ is resolved to frictional interfacial shear forces that "clamp" the fibers in the matrix. This mechanism effectively transfers the load to the matrix 205, increasing the energy required for crack propagation. This results in a tougher, higher strength CMC when compared to a CMC using fibers not coated in the manner of the invention.

This approach also results in the novel advantage that it avoids the fracture and detachment of the interfacial coating encountered in the fabrication of other CMCs. During one step in this process, the preceramic polymer pyrolysis, the matrix shrinks as volatile compounds escape. When the matrix bonds strongly to the outer coating layer, the shrinkage may pull the coating from the fiber and cracks are formed in prior art interfacial coatings. These coatings tend to fracture and become detached from the fibers, forming gaps. When more resin is infiltrated to densify the matrix, the resin fills in the gaps between the fiber and the fractured coating. This results in a CMC that does not divert matrix cracks and does not promote fiber pull-out. The multilayer structure of the invention avoids the formation of eyebrows and the adverse effects on strength found in prior art CMCs.

Figure 3:
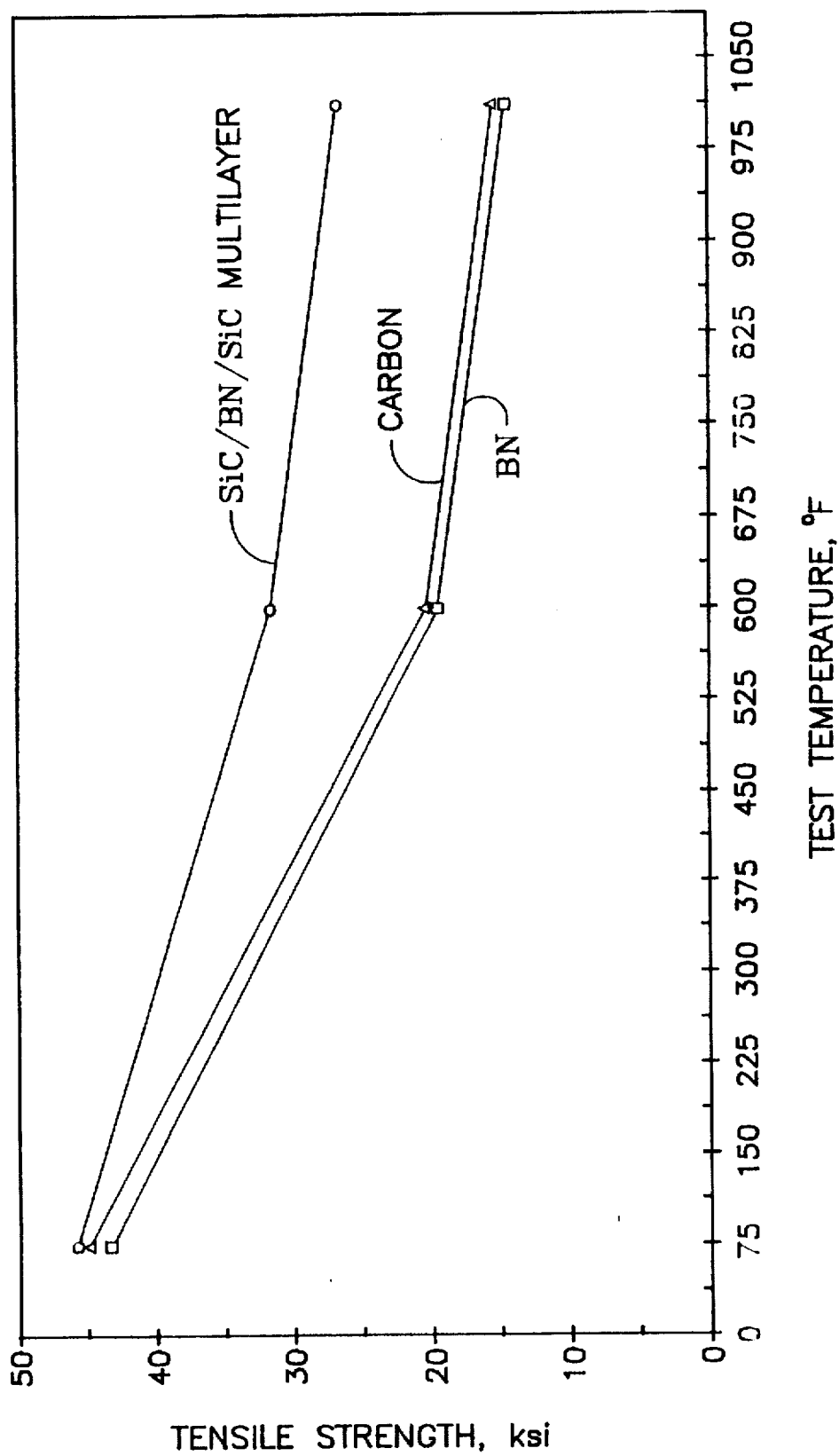
FIG. 3 is a graph of tensile strength versus test temperature for a CMC of the invention compared to CMC materials with other interfacial coatings.

As shown in FIG. 3, the tensile strength of a CMC of the invention is retained at higher temperatures compared to CMCs using fibers using other interfacial coatings, such as single layers of carbon or BN. For example, at 600 degrees F, a CMC of the invention has a tensile strength that is 50 percent higher than CMCs using fibers with other interfacial coatings.

Although the present invention has been described with reference to preferred embodiments, workers skilled in the art will recognize that changes may be made in form and detail without departing from the spirit and scope of the invention.

What is claimed:

1. A ceramic matrix composite, comprising:
   a ceramic fiber;
   a multi-layer coating on said fiber comprising plural alternating layers of oxidation resistant materials followed by easy-cleaved materials and an outer layer of an oxidation resistant material; and
   a ceramic matrix contacting said coating, said fiber and coating being embedded in said matrix.

2. The composite of claim 1 wherein said oxidation resistant material comprises a non-oxide ceramic material.

3. The composite claim 2 wherein said ceramic material is selected from the group of oxidation resistant non-oxide ceramics consisting of SiC and $Si_3N_4$.

4. The composite of claim 3 wherein different ones of said layers of oxidation resistant material comprise different ceramics of said group.

5. The composite of claim 1 wherein said easily-cleaved material is selected from the group of easily-cleaved materials consisting of C and BN.

6. The composite of claim 5 wherein said different ones of said layers of easily-cleaved material comprise different materials of said group.

7. The composite of claim 1 further comprising a protective layer between said fiber and said coating.

8. The composite of claim 7 wherein said protective layer comprises a protective material resistant to the transmission of corrosive gases.

9. The composite of claim 8 wherein said protective material is selected from the group of BN and C.

10. The composite of claim 9 wherein said protective layer is in the range of 50 to 100 angstroms in thickness.

11. The composite of claim 1 wherein said layers of oxidation resistant and easily-cleaved material are each in the range of 100 to 5000 angstroms in thickness.

12. A ceramic matrix composite, comprising:

a ceramic fiber;

a multi-layer coating on said fiber comprising a single layer of an easily-cleaved material between two layers of oxidation resistant materials; and a ceramic matrix contacting said coating, said fiber and coating being embedded in said matrix.

13. The composite of claim 12 wherein said oxidation resistant material comprises a non-oxide ceramic material.

14. The composite of claim 13 wherein said ceramic material is selected from the group of oxidation resistant non-oxide ceramics consisting of SiC and $Si_3N_4$.

15. The composite of claim 14 wherein different ones of said layers of oxidation resistant material comprise different ceramics of said group.

16. The composite of claim 14 wherein said easily cleaved material is selected from the group of easily-cleaved materials consisting of C and BN.

17. The composite of claim 12 further comprising a protective layer between said fiber and said coating.

18. The composite of claim 17 wherein said protective layer comprises a protective material resistant to the transmission of corrosive gases.

19. The composite of claim 18 wherein said protective material is selected from the group of BN and C.

20. The composite of claim 18 wherein said protective layer is in the range of 50 to 100 angstroms in thickness.

21. The composite of claim 12 wherein said layers are each in the range of 100 to 5000 angstroms in thickness.

* * * * *